US012177237B2

(12) United States Patent
Hasumi et al.

(10) Patent No.: US 12,177,237 B2
(45) Date of Patent: Dec. 24, 2024

(54) COMMUNICATION INFORMATION INTEGRATION SYSTEM, COMMUNICATION INFORMATION INTEGRATION METHOD, COMMUNICATION INFORMATION INTEGRATION APPARATUS, TERMINAL APPARATUS, AND COMPUTER READABLE RECORDING MEDIUM

(71) Applicant: NEC Corporation, Tokyo (JP)

(72) Inventors: Daichi Hasumi, Tokyo (JP); Satoshi Ikeda, Tokyo (JP); Shigeyoshi Shima, Tokyo (JP)

(73) Assignee: NEC CORPORATION, Tokyo (JP)

(*) Notice: Subject to any disclaimer, the term of this patent is extended or adjusted under 35 U.S.C. 154(b) by 734 days.

(21) Appl. No.: 17/281,342

(22) PCT Filed: Oct. 2, 2018

(86) PCT No.: PCT/JP2018/036957
§ 371 (c)(1),
(2) Date: Mar. 30, 2021

(87) PCT Pub. No.: WO2020/070811
PCT Pub. Date: Apr. 9, 2020

(65) Prior Publication Data
US 2021/0400068 A1    Dec. 23, 2021

(51) Int. Cl.
*H04L 29/00* (2006.01)
*H04L 9/40* (2022.01)

(52) U.S. Cl.
CPC .......... *H04L 63/1425* (2013.01); *H04L 63/20* (2013.01)

(58) Field of Classification Search
CPC ...... H04L 63/1425; H04L 63/20; G06F 13/00
See application file for complete search history.

(56) References Cited

U.S. PATENT DOCUMENTS 9,524,389 B1 * 12/2016 Roth .................. G06F 9/45558
9,654,485 B1 *  5/2017 Neumann .......... H04L 63/1416
(Continued)

FOREIGN PATENT DOCUMENTS

CN      105659245 A  *  6/2016 ......... H04L 63/1408
JP      2010-176191 A     8/2010
(Continued)

OTHER PUBLICATIONS

English translation of Written opinion for PCT Application No. PCT/JP2018/036957, mailed on Dec. 18, 2018.
(Continued)

*Primary Examiner* — Don G Zhao

(57) ABSTRACT

Provided is a communication information integration system 1 in which a communication information integration apparatus 3 classifies collected first communication information for each terminal apparatus 4, generates summary information summarizing the classified communication information corresponding to the terminal 4, and transmits the generated summary information to the corresponding terminal apparatus 4, the terminal apparatus 4, upon receiving the summary information, extracts a difference between the first communication information and second communication information collected by the terminal apparatus 4, using the second communication information and the summary information, generates difference communication information based on the extracted difference, and transmits the generated difference communication information to the communication information integration apparatus 3, and the communication information integration apparatus 3, upon receiving the difference communication information from the terminal apparatus 4, integrates the difference communication information into the first communication information.

4 Claims, 10 Drawing Sheets

(56) References Cited

U.S. PATENT DOCUMENTS

| | | | |
|---|---|---|---|
| 10,033,747 B1* | 7/2018 | Paithane | G06F 21/566 |
| 10,180,671 B2* | 1/2019 | Fu | G05B 13/025 |
| 10,581,879 B1* | 3/2020 | Paithane | G06F 21/566 |
| 2009/0254971 A1* | 10/2009 | Herz | G06Q 10/10 |
| | | | 726/1 |
| 2015/0170108 A1* | 6/2015 | Kim | G06Q 10/06311 |
| | | | 705/7.21 |
| 2017/0034198 A1* | 2/2017 | Powers | H04L 63/1441 |
| 2017/0178025 A1* | 6/2017 | Thomas | H04L 63/1425 |
| 2017/0180403 A1* | 6/2017 | Mehta | H04L 63/1425 |
| 2017/0201537 A1* | 7/2017 | Caldwell | H04J 3/0667 |
| 2020/0036592 A1* | 1/2020 | Kholaif | H04L 67/306 |
| 2020/0169570 A1* | 5/2020 | Kleymenov | H04L 63/1416 |
| 2021/0226973 A1* | 7/2021 | Hirano | H04W 4/44 |

FOREIGN PATENT DOCUMENTS

| | | |
|---|---|---|
| JP | 2010-198434 A | 9/2010 |
| JP | 2017-098870 A | 6/2017 |

OTHER PUBLICATIONS

International Search Report for PCT Application No. PCT/JP2018/036957, mailed on Dec. 18, 2018.

\* cited by examiner

Fig.3

Table 31:

| TERMINAL IDENTIFIER | TERMINAL IP |
|---|---|
| 0001 | 192.168.0.11 |
| 0002 | 192.168.0.12 |
| ... | ... |
| 0104 | 192.168.0.127 |
| ... | ... |

Table 32:

| DATE-TIME | CONNECTION DURATION | TRANSMISSION SOURCE IP | TRANSMISSION PORT | RECEPTION DESTINATION IP | RECEPTION PORT | TRANSMISSION BYTE | RECEPTION BYTE | NUMBER OF PACKETS |
|---|---|---|---|---|---|---|---|---|
| ... | ... | ... | ... | ... | ... | ... | ... | ... |
| 2018-04-10T16:21+09:00 | 1 | 192.168.0.11 | 61747 | 192.168.16.100 | 88 | 767 | 316 | 3 |
| 2018-04-10T16:36+09:00 | 362 | 192.168.0.11 | 61753 | 192.168.18.2 | 443 | 108 | 3429 | 10 |
| ... | ... | ... | ... | ... | ... | ... | ... | ... |
| 2018-04-10T16:44+09:00 | 8 | 192.168.72.1 | 65404 | 192.168.0.11 | 1900 | 236 | 0 | 1 |
| ... | ... | ... | ... | ... | ... | ... | ... | ... |

Fig.5

INTEGRATED INFORMATION 50

| DATE-TIME | CONNECTION DURATION | TRANSMISSION SOURCE IP | TRANSMISSION PORT | RECEPTION DESTINATION IP | RECEPTION PORT | TRANSMISSION BYTE | RECEPTION BYTE | NUMBER OF PACKETS |
|---|---|---|---|---|---|---|---|---|
| ... | ... | ... | ... | ... | ... | ... | ... | ... |
| 2018-04-10T16:21+09:00 | 1 | 192.168.0.11 | 61747 | 192.168.16.100 | 88 | 767 | 316 | 3 |
| 2018-04-10T16:22+09:00 | 12 | 192.168.0.11 | 61748 | 192.168.0.232 | 22 | 4569 | 233 | 12 |
| 2018-04-10T16:36+09:00 | 362 | 192.168.0.11 | 61753 | 192.168.18.21 | 443 | 108 | 3429 | 10 |
| ... | ... | ... | ... | ... | ... | ... | ... | ... |
| 2018-04-10T16:44+09:00 | 8 | 192.168.72.1 | 65404 | 192.168.0.11 | 1900 | 236 | 0 | 1 |
| ... | ... | ... | ... | ... | ... | ... | ... | ... |

Fig.6

| DATE-TIME | CONNECTION DURATION | TRANSMISSION SOURCE IP | TRANSMISSION PORT | RECEPTION DESTINATION IP | RECEPTION PORT | TRANSMISSION BYTE | RECEPTION BYTE | NUMBER OF PACKETS |
|---|---|---|---|---|---|---|---|---|
| ... | ... | ... | ... | ... | ... | ... | ... | ... |
| 2018-04-10T16:21+09:00 | 1 | 192.168.0.11 | 61747 | 192.168.16.100 | 88 | 767 | 316 | 3 |
| 2018-04-10T16:22+09:00 | 12 | 192.168.0.11 | 61748 | 192.168.0.232 | 22 | 4569 | 233 | 12 |
| 2018-04-10T16:36+09:00 | 362 | 192.168.0.11 | 61753 | 192.168.18.21 | 443 | 108 | 3429 | 10 |
| ... | ... | ... | ... | ... | ... | ... | ... | ... |
| 2018-04-10T16:44+09:00 | 8 | 192.168.72.1 | 65404 | 192.168.0.11 | 1900 | 236 | 0 | 1 |
| ... | ... | ... | ... | ... | ... | ... | ... | ... |

61

COMMUNICATION INFORMATION INTEGRATION SYSTEM, COMMUNICATION INFORMATION INTEGRATION METHOD, COMMUNICATION INFORMATION INTEGRATION APPARATUS, TERMINAL APPARATUS, AND COMPUTER READABLE RECORDING MEDIUM

This application is a National Stage Entry of PCT/JP2018/036957 filed on Oct. 2, 2018, the contents of all of which are incorporated herein by reference, in their entirety.

TECHNICAL FIELD

The present invention relates to a communication information integration system, a communication information integration method, a communication information integration apparatus, and a terminal apparatus that integrate communication information, and further relates to a computer readable recording medium including a program recorded thereon for realizing the system, method, and apparatuses.

BACKGROUND ART

In recent years, due to cyber attacks targeting intra-organization systems, damage such as information leakage, damage to credit, and the like have increased, and there is a demand for strengthening cyber attack countermeasures. In order to strengthen cyber attack countermeasures, it is necessary to conduct an inspection of the circumstances at the time when an incident due to a cyber attack occurred, and to obtain evidence and proof of the attack, information leakage, and the like from communication information (e.g., communication logs) collected from the intra-organization system.

Furthermore, the importance of the rules for collecting communication logs, the mechanisms for collecting the communication logs, management of the communication logs, and the like in various systems such as intra-organization systems has been reaffirmed as a countermeasure against cyber attacks. In particular, the importance of mechanisms for monitoring the flow of data in intra-organization systems has been pointed out.

As a related technique, Patent Document 1 discloses a data collection system that can efficiently collect, accumulate, and easily browse node information in a computer system. According to that data collection system, a plurality of data collection devices share processing for collecting node information, which is information included in a plurality of nodes in a network, from the nodes, and the node information collected by the data collection devices is accumulated in the storage device without redundancy. Thereafter, the data collection devices obtain the node information designated by a node information request, from the storage device, and provide the node information.

LIST OF RELATED ART DOCUMENTS

Patent Document

Patent Document 1: Japanese Patent Laid-Open Publication No. 2010-198434

SUMMARY OF INVENTION

Problems to be Solved by the Invention

However, if the target system is a large-scale network, integrating and recording all the communication logs in the network in one place maybe difficult depending on the specifications of the devices constituting the network.

Specifically, in a system that adopts an IP (Internet Protocol) network, IP communications between the terminal apparatuses connected under the same network hub are returned at that network hub. For this reason, the device (e.g., a security appliance) that collects communication logs upstream of the IP network cannot integrate and record all the communication logs in the network in one place. In other words, in the above-described network constituted using a hub, a router, and the like that are connected in multi-stages, integrating and recording all the communication logs in the network in one place is difficult.

Even so, when wanting to integrate and record all the communication logs in the network in one place, at present, for example, all the network switches provided in the network are provided with mirror ports corresponding to sub networks of the network switches such that packets are collected and recorded in the storage device. However, setting the mirror ports takes a lot of time and effort.

Furthermore, another method is conceivable in which the communication logs are locally extracted from the terminal apparatuses and recorded, but it also takes a lot of time and effort when the communication logs are locally extracted from the terminal apparatuses and recorded.

Furthermore, another method is also conceivable in which the communication logs are obtained via a network and recorded using a remote forensic tool, or an OS (Operation System)-specific management tool. However, when obtaining the communication logs recorded in the terminal apparatuses via the network, since a large volume of communication logs are collected from many terminal apparatuses, an excessive communication load is placed on the network.

An example object of the invention is to provide a communication information integration system, a communication information integration method, a communication information integration apparatus, and a terminal apparatus that efficiently integrate communication information that is used in the target system, and a computer readable recording medium.

Means for Solving the Problems

In order to achieve the above-described object, a communication information integration system according to an example aspect of the invention is
a communication information integration system in which a plurality of terminal apparatuses and a communication information integration apparatus communicate via a network,
in which the communication information integration apparatus classifies collected first communication information for each terminal apparatus, generates summary information summarizing the classified communication information corresponding to the terminal apparatus, and transmits the generated summary information to the corresponding terminal apparatus, and
upon receiving, from the terminal apparatus, difference communication information that is generated by the terminal apparatus based on second communication information collected by the terminal apparatus and the summary information, the communication information integration apparatus integrates the difference communication information into the first communication information, and
the terminal apparatus, upon receiving the summary information, extracts a difference between the first communication information and the second communication information collected by the terminal apparatus using the second communication information and the summary information, generates the difference communication information based on the extracted difference, and transmits the generated difference communication information to the communication information integration apparatus.

Furthermore, in order to achieve the above-described object, a communication information integration method according to an example aspect of the invention is a communication information integration method in a network that includes a plurality of terminal apparatuses and a communication information integration apparatus, the method including:

the communication information integration apparatus classifying collected first communication information for each terminal apparatus, generating summary information summarizing the classified communication information corresponding to the terminal apparatus, and transmitting the generated summary information to the corresponding terminal apparatus;

when the terminal apparatus receives the summary information, the terminal apparatus extracting a difference between the first communication information and second communication information collected by the terminal apparatus, using the second communication information and the summary information, generating the difference communication information based on the extracted difference, and transmitting the generated difference communication information to the communication information integration apparatus; and when the communication information integration apparatus receives the difference communication information generated by the terminal apparatus from the terminal apparatus, the communication information integration apparatus integrating the difference communication information into the first communication information.

Furthermore, in order to achieve the above-described object, a communication information integration apparatus according to an example aspect of the invention is a communication information integration apparatus including:

summary information generation unit configured to classify collected first communication information for each terminal apparatus that communicates via a network, and generate summary information summarizing the classified communication information corresponding to the terminal apparatus; and communication information integration unit configured to, upon receiving, from the terminal apparatus, difference communication information that indicates a difference between the first communication information and second communication information collected by the terminal apparatus and is generated by the terminal apparatus, using the second communication information and the summary information received via the network, integrate the difference communication information into the first communication information.

Furthermore, in order to achieve the above-described object, a computer readable recording medium according to an example aspect of the invention includes a program recorded thereon, the program including instructions that cause the computer to carry out:

classifying collected first communication information for each terminal apparatus that communicates via a network, and generating summary information summarizing the classified communication information corresponding to the terminal apparatus; and upon receiving, from the terminal apparatus, difference communication information that indicates a difference between the first communication information and second communication information collected by the terminal apparatus and is generated by the terminal apparatus, using the second communication information and the summary information received via the network, integrating the difference communication information into the first communication information.

Furthermore, in order to achieve the above-described object, a terminal apparatus according to an example aspect of the invention includes difference communication information generation unit configured to, upon receiving, from a communication information integration apparatus that communicates via a network, summary information that is generated by the communication information integration apparatus classifying collected first communication information for each terminal apparatus and summarizing the classified communication information corresponding to the terminal apparatus, generate difference communication information that indicates a difference between the first communication information and collected second communication information, using the second communication information and the summary information.

Furthermore, in order to achieve the above-described object, a computer readable recording medium according to an example aspect of the invention includes a program recorded thereon, the program including instructions that cause the computer to carry out:

upon receiving, from a communication information integration apparatus that communicates via a network, summary information that is generated by the communication information integration apparatus classifying collected first communication information for each terminal apparatus and summarizing the classified communication information corresponding to the terminal apparatus, generating difference communication information that indicates a difference between collected second communication information and the summary information.

Advantageous Effects of the Invention

As described above, according to the invention, communication information used in the target system can be efficiently integrated.

BRIEF DESCRIPTION OF THE DRAWINGS

FIG. 3 is a diagram showing an example of the data structure of terminal information and upstream communication information.

FIG. 5 is a diagram showing an example of the data structure of integrated information.

FIG. 6 is a diagram showing an example of the data structure of downstream communication information.

EXAMPLE EMBODIMENT

Example Embodiment

Hereinafter, an example embodiment of the invention will be described with reference to FIGS. 1 to 10.

System Configuration

Figure 1:
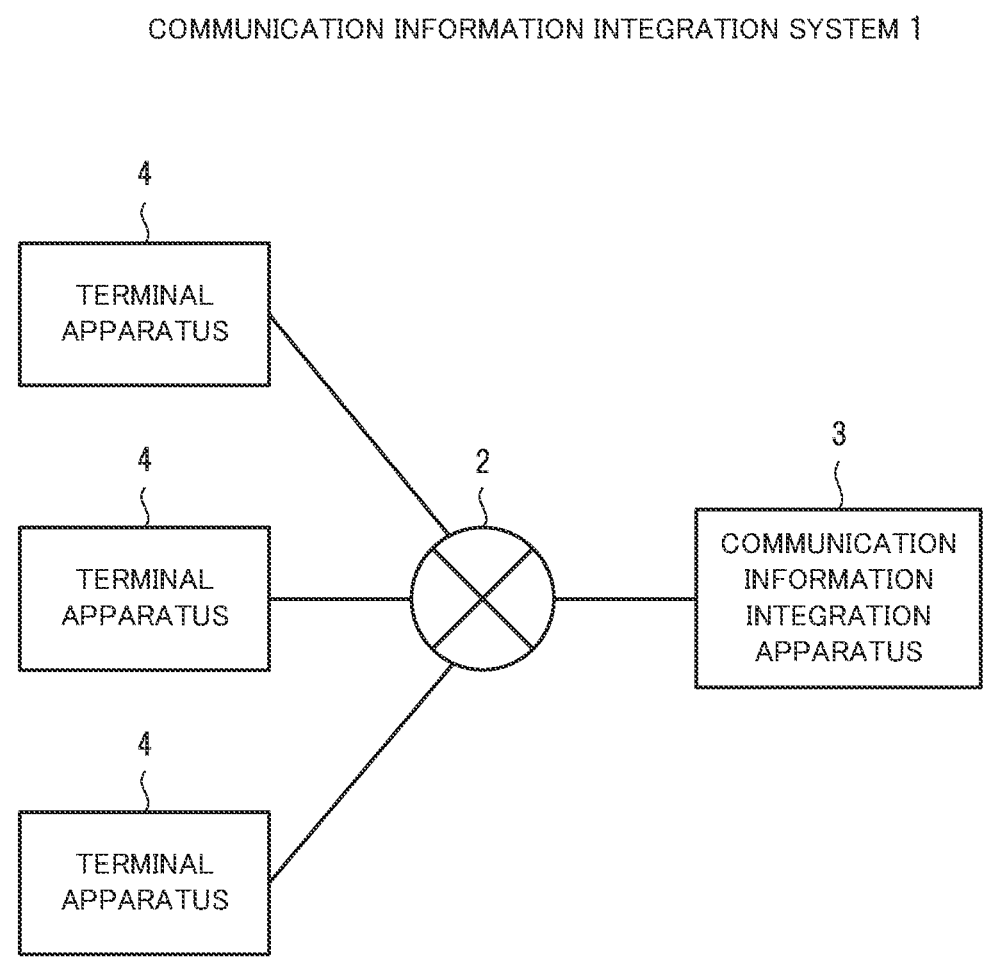
FIG. 1 is a diagram showing an example of a communication information integration system.

First, the configuration of a communication information integration system in the example embodiment will be described using FIG. 1. FIG. 1 is a diagram showing an example of a communication information integration system.

The communication information integration system shown in FIG. 1 is a system that efficiently integrates communication information used in the target system. Also, as shown in FIG. 1, a communication information integration system 1 includes a communication information integration apparatus 3 and a plurality of terminal apparatuses 4 that are connected to each other via a network 2 and communicate with each other.

Of these, the communication information integration apparatus 3 classifies collected upstream communication information (first communication information) for each terminal apparatus 4, generates summary information summarizing the classified communication information corresponding to the terminal apparatus 4, and transmits the generated summary information to the corresponding terminal apparatus 4. Furthermore, upon receiving, from the terminal apparatus 4, difference communication information that is generated by the terminal apparatus 4 based on downstream communication information (second communication information) that is collected by the terminal apparatus 4 and the summary information, the communication information integration apparatus 3 integrates the difference communication information into the upstream communication information.

When each terminal apparatus 4 receives the summary information, the terminal apparatus 4 extracts a difference between the upstream communication information and the downstream communication information using the downstream communication information that is collected by the terminal apparatus 4 and the summary information, generates the difference communication information based on the extracted difference, and transmits the generated difference communication information to the communication information integration apparatus 3.

In this manner, according to the example embodiment, since the downstream communication information (difference communication information) that is collected downstream of the network and is not included in the upstream communication information that is collected upstream of the network is integrated into the upstream communication information in the target system, communication information without redundancy can be integrated and collected in one place. Accordingly, the communication information used in the target system can be efficiently integrated.

Apparatus Configuration

Figure 2:
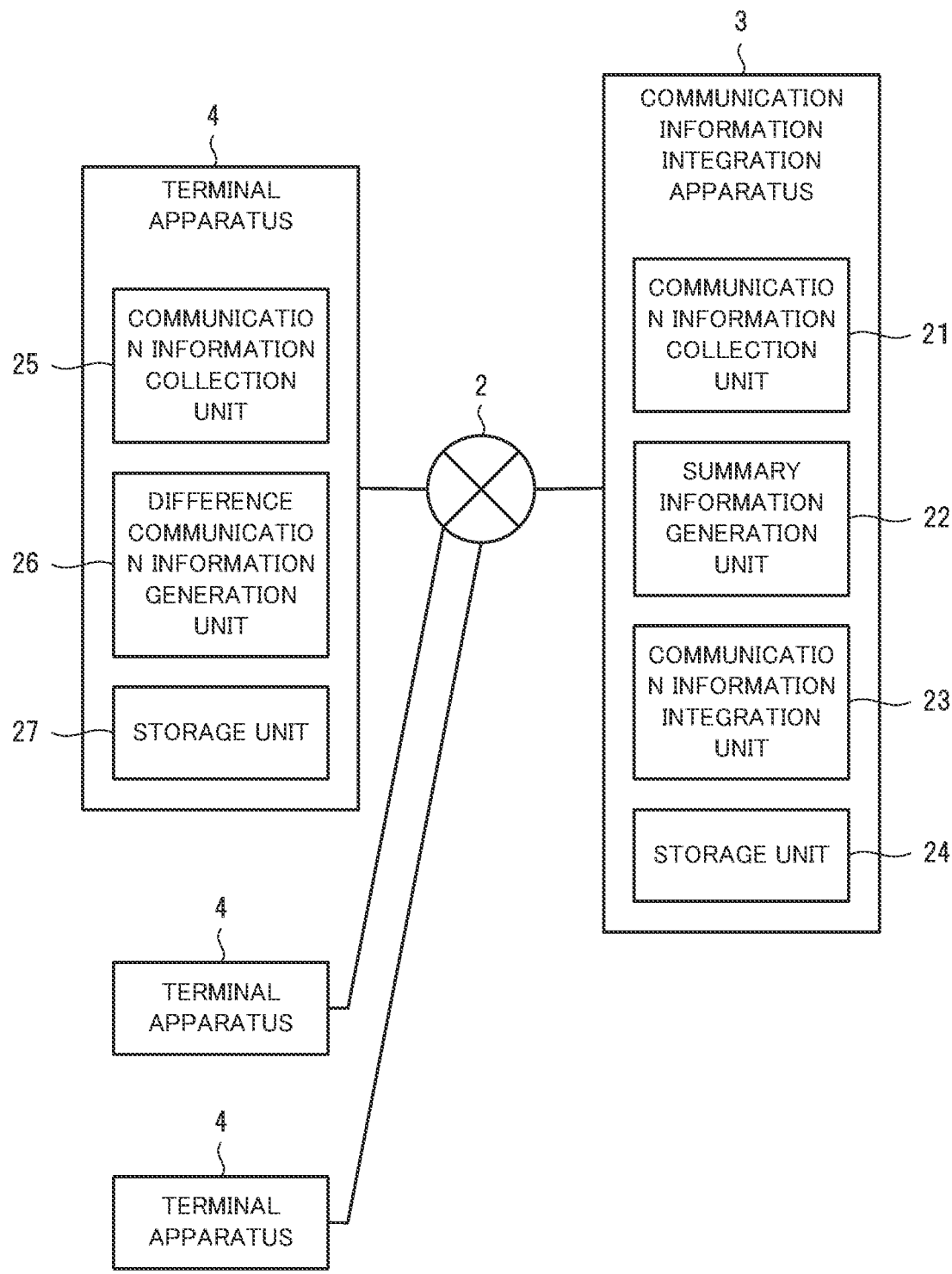
FIG. 2 is a diagram showing an example of a communication information integration apparatus and terminal apparatuses.

Next, the configuration of the communication information integration system 1 in the example embodiment will be described more specifically using FIG. 2. FIG. 2 is a diagram showing a specific example of the communication information integration system.

The communication information integration apparatus 3 and the plurality of terminal apparatuses 4 are connected to the network 2. The network 2 is an IP network or the like constituted using components such as a hub, a router, and network switches.

The communication information integration apparatus 3 records upstream communication information such as communication logs that are collected upstream of the network 2. The communication information integration apparatus 3 also generates the summary information for each terminal apparatus 4 based on the upstream communication information, and transmits the summary information to the corresponding terminal apparatus 4. Furthermore, the communication information integration apparatus 3 receives, from the terminal apparatuses 4, the difference communication information that indicates the difference between downstream communication information such as the communication logs collected by the terminal apparatuses 4 and the summary information. After that, the communication information integration apparatus 3 generates the integrated information by integrating the difference communication information into the upstream communication information, and records the integrated information. Note that the communication information integration apparatus 3 is an information processing device provided with a communication function, such as a server computer or a personal computer.

The communication information integration apparatus 3 will now be specifically described. The communication information integration apparatus 3 includes, for example, a communication information collection unit 21, a summary information generation unit 22, a communication information integration unit 23, and a storage unit 24.

The communication information collection unit 21 receives the communication information that can be collected upstream of the network 2 through wireless or wired communication or the like, and stores the collected communication information in the storage unit 24 as the upstream communication information. Note that the communication information collection unit 21 may also be separately provided outside the communication information integration apparatus 3. In such a case, the communication information collection unit 21 performs communication with the communication information integration apparatus 3 and the plurality of terminal apparatuses 4 via the network 2.

The summary information generation unit 22 first classifies the collected upstream communication information for each of the terminal apparatuses 4 that communicate therewith via the network 2. Specifically, the summary information generation unit 22 classifies the upstream communication information for each terminal apparatus 4 using the terminal information and the upstream communication information that are stored in the storage unit 24. For example, the summary information generation unit 22 classifies the upstream communication information for each terminal apparatus 4 as shown in FIG. 3.

FIG. 3 is a diagram showing an example of the data structure of the terminal information and the upstream communication information. In the terminal information 31 shown in FIG. 3, "terminal identifier" which is information for identifying the terminal apparatus 4, and "terminal IP" which is information indicating the IP address of the terminal apparatus 4 serving as the transmission source of the terminal apparatus 4, are stored in association with each other. In the example of FIG. 3, "0001", "0002", . . . "0104" and the like are stored as "terminal identifier", and "192.168.0.11", "192.168.0.12", . . . "192.168.0.127" and so on are stored as "terminal IP".

Furthermore, the upstream communication information 32 shown in FIG. 3 is the upstream communication information that is classified using the terminal IP "192.168.0.11" with respect to the terminal apparatus 4 corresponding to the terminal identifier "0001". Furthermore, in the upstream communication information 32 shown in FIG. 3, "date-time" which is information indicating the date and time, "connection duration" which is information indicating the time period during which the transmission source and the reception destination were connected to each other, "transmission source IP" which is information indicating the IP address of the terminal apparatus 4 serving as the transmission source, "transmission port" which is information indicating the transmission port number, "reception destination IP" which is information indicating the IP address of the terminal apparatus 4 serving as the reception destination, and "reception port" which is information indicating the reception port number are stored in association with each other. Furthermore, in the example of FIG. 3, "transmission bytes" which is information indicating the number of transmitted bytes, "reception bytes" which is information indicating the number of the received bytes, and "number of packets" which is information indicating the number of the packets, are stored in association with each other.

Next, the summary information generation unit 22 generates the summary information summarizing the upstream communication information classified for each terminal apparatus 4. Specifically, the summary information generation unit 22 performs mask processing on predetermined information of the classified upstream communication information, and generates the summary information by summarizing information serving as a key information, out of the upstream communication information thus classified and subjected to mask processing.

Mask processing on predetermined information will be described below. The date and time when the communication information reaches the terminal apparatus 4 frequently deviates due to the position where the terminal apparatus 4 is connected to the network 2 and the like. For this reason, if the dates and times stored in "date-time" and "connection duration" are used as is, due to a slight deviation in the date and time and the connection duration, the same communication information may be determined to be different communication information. In view of this, with respect to the date and time stored in "date-time" and "connection duration", a time of one second or less is replaced with a predetermined character or the like, for example. By doing this, the case in which the same communication information is determined to be different communication information is reduced.

In "2018-04-10T16:21+09:00" stored in "date-time" shown in FIG. 3, if a time of one second or less is replaced with a predetermined character "x", "date-time" will be "2018-04-10T16:2x+09:00". Furthermore, in the case of "1", "362", . . . "8" and the like stored in "connection duration" shown in FIG. 3, "connection duration" will be "x," "36x", . . . "x".

The key information is information including at least "date-time" and "connection duration" that are subjected to mask processing, and "transmission source IP", "transmission port", "reception destination IP", and "reception port".

The summary information is generated by applying a probabilistic data structure such as a Bloom filter or a data compression expression structure such as a ZDD (Zero-suppressed Binary Decision Diagram) or a BDD (Binary Decision Diagram) to the key information.

A case where the Bloom filter is used for generating the summary information will be described below. First, the summary information generation unit 22 sequentially couples pieces of the key information. For example, if the key information includes "2018-04-10T16:2x+09:00", "x", "192.168.0.11", "61747", "192.168.16.100", "88", "767", "316" and "3", the summary information generation unit 22 couples these pieces of data to generate a character string "2018-04-10T16:2x+09: 00x192.168.0.1161747192.168.16.100887673163". Thereafter, the summary information generation unit 22 converts the coupled pieces of information into a byte string to obtain "323031382d30342d31305431363a32782b30393a3030783 139322e3136382e302e31313163137 34373139322e3136382e31362e3130303838373637333136 33" (in hexadecimal notation).

Subsequently, in order to generate a Bloom filter having an arbitrary bit string length m set in advance, the summary information generation unit 22 inputs the above byte string thus converted into a group of k hash functions of an arbitrary type that is prepared in advance. Next, the summary information generation unit 22 sets the bits of the Bloom filter that are indicated by the respective outputs of the hash functions to "1", and generates the Bloom filter. Next, the summary information generation unit 22 generates the summary information in which the target date and time, the hash function seed value, and the Bloom filter are the payload. Note that the target date and time is information indicating the time period for generating the integrated information.

Figure 4:
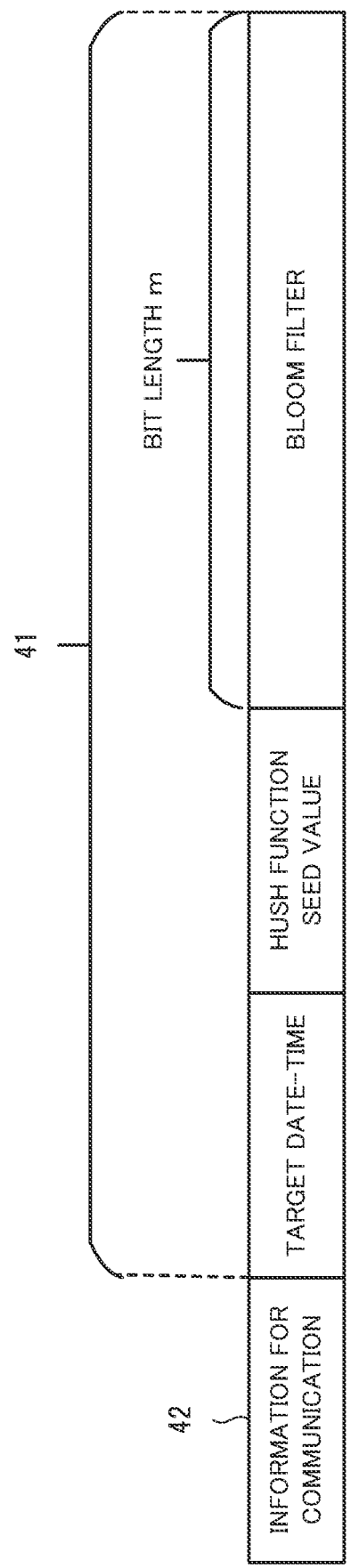
FIG. 4 is a diagram showing an example of the data structure of summary information.

Next, the summary information generation unit 22 transmits the summary information to the target terminal apparatus 4. For example, the summary information generation unit 22 transmits the summary information to the target terminal apparatus 4 using the HTTPS protocol or the like. FIG. 4 is a diagram showing an example of the data structure of the summary information. Information for communication 42 shown in FIG. 4 is information used for performing communication with the terminal apparatus 4, for example. Since the seed value may be unnecessary depending on the type of hash function used in the Bloom filter, in such a case, the hash function seed value need not be included in the payload.

The communication information integration unit 23 first receives difference communication information from each terminal apparatus 4. In other words, the communication information integration unit 23 receives, from each of the terminal apparatuses 4, the difference communication information (described later) that is generated by each terminal apparatus 4 based on the downstream communication information collected by the terminal apparatus 4 and the summary information. Next, the communication information integration unit 23 generates the integrated information by integrating the difference communication information received from the terminal apparatuses 4 into the upstream communication information. Specifically, the communication information integration unit 23 obtains the upstream communication information stored in the storage unit 24, and adds the difference communication information received from the terminal apparatus 4 to the obtained upstream communication information.

For example, the communication information integration unit 23 generates the integrated information 50 shown in FIG. 5 by adding the difference communication information received from the terminal apparatuses 4 that is not included in the upstream communication information 32 to the upstream communication information 32 shown in FIG. 3 that is obtained from the storage unit 24, and stores the integrated information in the storage unit 24. FIG. 5 is a diagram showing an example of the data structure of the integrated information. Integrated communication information 51 shown in FIG. 5 is information formed by adding difference communication information 52 (regions surrounded by the solid bold lines) of the terminal apparatus 4 corresponding to the terminal identifier "0001" to the upstream communication information 32 of the terminal apparatus 4 corresponding to the terminal identifier "0001" shown in FIG. 3.

The storage unit 24 stores the upstream communication information collected by the communication information collection unit 21 and the difference communication information obtained from the terminal apparatuses 4. In other words, the storage unit 24 stores the integrated information. Note that the storage unit 24 may be provided in the communication information integration apparatus 3 or outside the communication information integration apparatus 3.

Each terminal apparatus 4 first receives the summary information from the communication information integration apparatus 3 which communicates therewith via the network 2. In other words, each terminal apparatus 4 receives, from the communication information integration apparatus 3, the summary information generated by the communication information integration apparatus 3 by classifying the collected upstream communication information for each terminal apparatus 4 and summarizing the classified communication information corresponding to the terminal apparatus 4. Subsequently, each terminal apparatus 4 extracts the difference between the upstream communication information and the downstream communication information using the downstream communication information collected by that terminal apparatus 4 and the summary information, and generates the difference communication information based on the extracted difference. Note that the terminal apparatuses 4 are information processing devices, such as server computers, personal computers, or smart phones that are provided with a communication function.

The terminal apparatuses 4 will be specifically described below. The terminal apparatuses 4 each include a communication information collection unit 25, a difference communication information generation unit 26, and a storage unit 27.

The communication information collection unit 25 receives the communication information that can be collected downstream of the network 2 through wireless or wired communication or the like, and stores the collected communication information in the storage unit 27 as the downstream communication information. Specifically, the communication information collection unit 25 generates downstream communication information 61 such as shown in FIG. 6. FIG. 6 is a diagram showing an example of the data structure of the downstream communication information. The downstream communication information 61 shown in FIG. 6 is downstream communication information collected by the terminal apparatus 4 corresponding to the terminal identifier "0001" shown in FIG. 3.

The difference communication information generation unit 26 obtains the summary information from the communication information integration apparatus 3 via the network 2, extracts the difference between the upstream communication information and the downstream communication information using the downstream communication information and the summary information, and generates the difference communication information based on the extracted difference. Specifically, the difference communication information generation unit 26 performs mask processing on predetermined information of the downstream communication information, extracts the downstream communication information that is not included in the upstream communication information, using the downstream communication information that was subjected to mask processing and the summary information, and generates the difference communication information based on the extracted downstream communication information.

Since the mask processing performed on predetermined information of the downstream communication information is the mask processing described above, the description thereof is omitted. Note that the key information is information including at least "date-time" and "connection duration" that are subjected to mask processing, and "transmission source IP", "transmission port", "reception destination IP", and "reception port".

A case in which a Bloom filter is used for generating the difference communication information will be described below. First, the difference communication information generation unit 26 obtains the target downstream communication information corresponding to the target date and time included in the summary information, sequentially couples the pieces of key information as described above, and converts the coupled pieces of information into a byte string. Next, the difference communication information generation unit 26 inputs the above-described byte string thus converted, into a group of k hash functions of the Bloom filter having a preset bit string length m, and obtains the outputs of the respective hash functions.

Next, the difference communication information generation unit 26 collates the bit positions indicated by the respective outputs of the above-described hash functions and the positions where the bits are "1" in the Bloom filter included in the summary information. As a result, if the bit positions indicated by the respective outputs of all the hash functions and the corresponding bit positions of the Bloom filter are all "1", the difference communication information generation unit 26 determines that the target downstream communication information has been already stored in the communication information integration apparatus 3.

On the other hand, if any of the bit positions indicated by the respective outputs of all the hush functions or any of the corresponding bit positions of the Bloom filter is not "1" (i.e., is "0"), the difference communication information generation unit 26 determines that the target downstream communication information has not been stored in the communication information integration apparatus 3. Note that the case where the probabilistic data structure using a Bloom filter is used for determining the difference has been described here, but a data compression expression structure such as a ZDD or a BDD may also be applied.

Next, the difference communication information generation unit 26 transmits the generated difference communication information to the communication information integration apparatus 3. For example, the difference communication information generation unit 26 transmits the difference communication information to the communication information integration apparatus 3 using the HTTPS protocol or the like.

The storage unit 27 stores the downstream communication information collected by the communication information collection unit 25 and the difference communication information. Note that the storage unit 27 may be provided in the terminal apparatus 4 or outside the terminal apparatus 4.

System Operations

Figure 7:
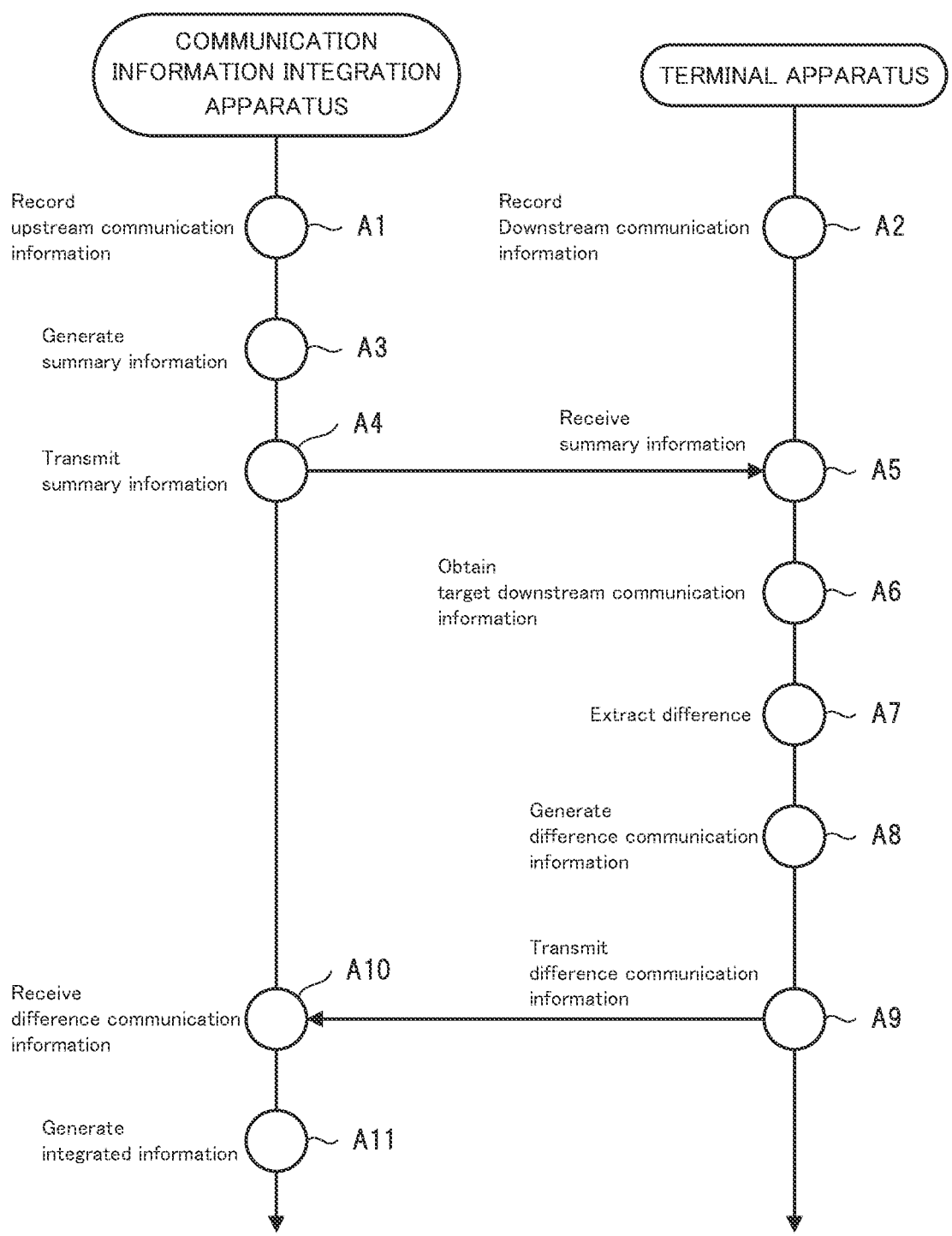
FIG. 7 is a diagram showing an example of the operations of the communication information integration system.
Figure 8:
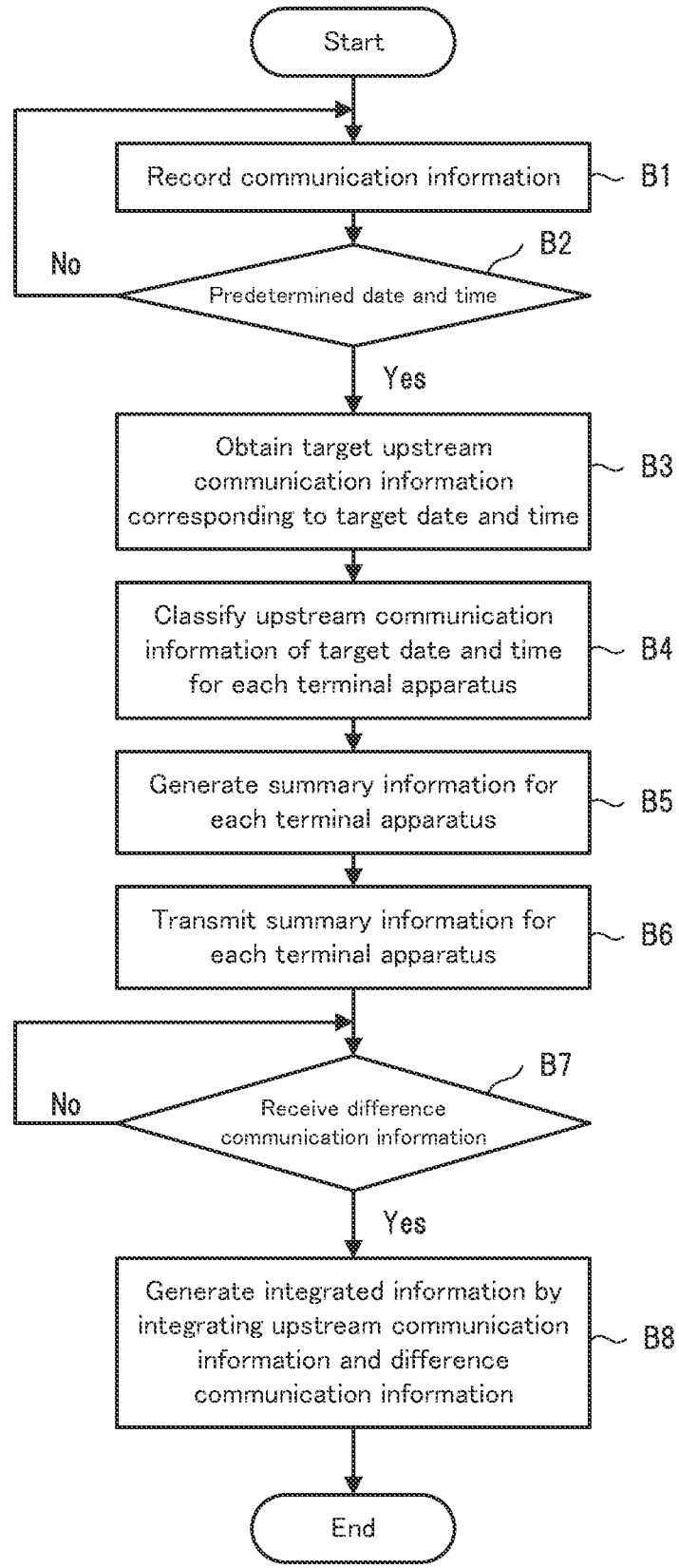
FIG. 8 is a diagram showing an example of the operations of the communication information integration apparatus.
Figure 9:
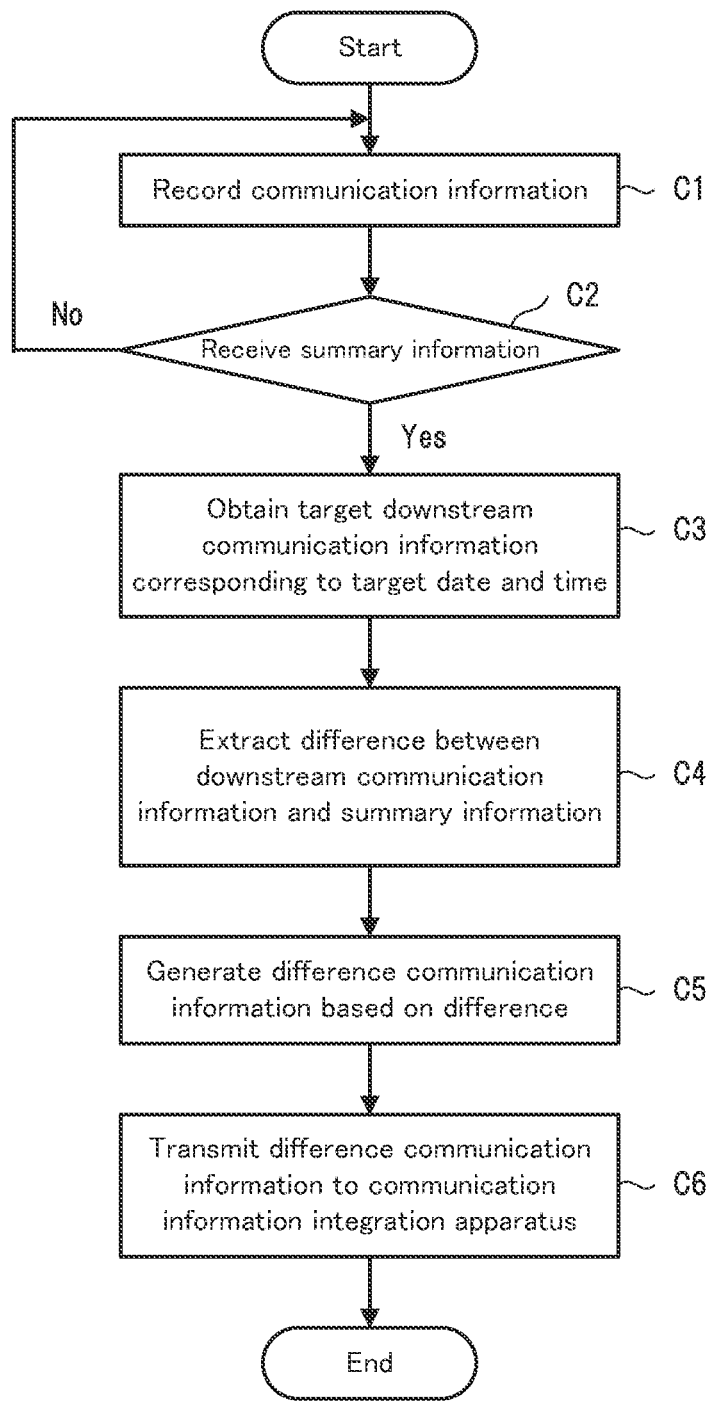
FIG. 9 is a diagram showing an example of the operations of the terminal apparatus.

Next, the operations of the communication information integration system in the example embodiment of the invention will be described using FIGS. 7, 8, and 9. FIG. 7 is a diagram showing an example of the operations of the communication information integration system. FIG. 8 is a diagram showing an example of the operations of the communication information integration apparatus. FIG. 9 is a diagram showing an example of the operations of a terminal apparatus. In the description below, FIG. 2 to FIG. 6 are referenced as appropriate.

Also, in the example embodiment, the communication information integration method is implemented by operating the communication information integration system 1 (system including the communication information integration apparatus 3 and the terminal apparatuses 4). Therefore, the following description of the operations of the communication information integration system will be given in place of a description of a communication information integration method in the example embodiment.

As shown in FIG. 7, the communication information integration apparatus 3 stores the upstream communication information in the storage unit 24 via the network 2 (step A1). Also, the terminal apparatus 4 stores the downstream communication information in the storage unit 27 via the network 2 (step A2).

Next, when a preset date and time arrives, the communication information integration apparatus 3 generates the summary information to be transmitted to the terminal apparatuses 4 (step A3). Thereafter, the communication information integration apparatus 3 transmits the summary information generated for each of the terminal apparatuses 4 to the corresponding terminal apparatuses 4 (step A4).

Next, each terminal apparatus 4 receives the summary information transmitted from the communication information integration apparatus 3 (step A5). Thereafter, the terminal apparatus 4 obtains the downstream communication information by referencing the summary information (step A6). For example, in step A6, the terminal apparatus 4 obtains the downstream communication information at a predetermined time at which collection was performed in the past, by referencing "target date-time" of the summary information.

Next, the terminal apparatus 4 extracts the difference based on the downstream communication information and the summary information (step A7). Thereafter, the terminal apparatus 4 generates the difference communication information based on the extracted difference (step A8). Specifically, in step A8, the terminal apparatus 4 performs mask processing on predetermined information of the downstream communication information, extracts the downstream communication information that is not included in the upstream communication information using the downstream communication information that was subjected to the mask processing and the summary information, and generates the difference communication information based on the extracted downstream communication information. Then, the terminal apparatus 4 transmits the difference communication information to the communication information integration apparatus 3 (step A9).

Subsequently, the communication information integration apparatus 3 receives the difference communication information from the terminal apparatus 4 (step A10). After that, the communication information integration apparatus 3 generates the integrated information using the upstream communication information and the difference communication information (step A11).

Next, the operations of the communication information integration apparatus 3 will be described using FIG. 8. The communication information collection unit 21 of the communication information integration apparatus 3 receives the communication information that can be collected upstream of the network 2 through wireless or wired communication or the like, and stores the collected communication information in the storage unit 24 as the upstream communication information (step B1).

Next, when a predetermined date and time arrives (step B2: Yes), the summary information generation unit 22 of the communication information integration apparatus 3 obtains the upstream communication information that was collected at the target date and time and stored in the storage unit 24 (step B3). On the other hand, if the predetermined date and time has not arrived (step B2: No), the processing transitions to processing of step B1.

Subsequently, the summary information generation unit 22 classifies the upstream communication information for each terminal apparatus 4 using the terminal information (see 31 in FIG. 3) and the upstream communication information (step B4). Subsequently, the summary information generation unit 22 generates the summary information (see 41 in FIG. 4) summarizing the upstream communication information (see 32 in FIG. 3) classified for each terminal apparatus 4 (step B5).

Specifically, in step B5, first, the summary information generation unit 22 performs mask processing on predetermined information of the classified upstream communication information, and generates the summary information by summarizing the key information, out of the upstream communication information thus classified and subjected to mask processing. Note that the summary information is generated by applying a probabilistic data structure such as a Bloom filter, or a data compression expression structure such as a ZDD or a BDD, to the key information.

Next, the summary information generation unit 22 transmits the summary information to the target terminal apparatus 4 (step B6). Thereafter, upon receiving the difference communication information that is a response to the summary information from each terminal apparatus 4 (step B7: Yes), the communication information integration unit 23 generates the integrated information (see 50 in FIG. 5) by integrating the upstream communication information (see 32 in FIG. 3) and the difference communication information (see 62 in FIG. 6) (step B8). In other words, the communication information integration unit 23 obtains the upstream communication information stored in the storage unit 24, and adds the difference communication information received from the terminal apparatuses 4 to the obtained upstream communication information.

Next, the operations of the terminal apparatuses 4 will be described using FIG. 9. The communication information collection unit 25 of each terminal apparatus 4 receives the communication information that can be collected upstream of the network 2 through wireless or wired communication or the like, and stores the collected communication information in the storage unit 27 as the downstream communication information (see 61 in FIG. 6) (step C1).

Subsequently, upon receiving the summary information from the communication information integration apparatus 3 (step C2: Yes), the difference communication information generation unit 26 of the terminal apparatus 4 obtains the downstream communication information that was collected at the target date and time and stored in the storage unit 27 (step C3). On the other hand, if the predetermined date and time has not arrived (step C2: No), the processing transitions to processing of step C1.

Subsequently, the difference communication information generation unit 26 extracts the difference between the downstream communication information and the summary information, and generates the difference communication information based on the extracted difference (step C4). Specifically, in step C4, the difference communication information generation unit 26 performs mask processing on predetermined information of the downstream communication information, and extracts the difference between the downstream communication information that is not included in the upstream communication information and the summary information, using the downstream communication information that was subjected to mask processing and the summary information. Note that a probabilistic data structure such as a Bloom filter or a data compression expression structure such as a ZDD or a BDD may be applied in determining the difference.

Note that since the mask processing performed on predetermined information of the downstream communication information is the mask processing described above, the description thereof is omitted. Note that the key information is information including at least "date-time" and "connection duration" that were subjected to mask processing, and "transmission source IP", "transmission port", "reception destination IP", and "reception port".

Subsequently, the difference communication information generation unit 26 generates the difference communication information using the extracted difference (step C5). Next, the difference communication information generation unit 26 transmits the difference communication information to the communication information integration apparatus 3 (step C6). For example, in step C6, the difference communication information generation unit 26 transmits the difference communication information to the communication information integration apparatus 3 using the HTTPS protocol or the like.

Effects of the Present Example Embodiment

In this manner, according to the example embodiment, since the downstream communication information (difference communication information) that is collected downstream of the network and is not included in the upstream communication information that is collected upstream of the network is integrated into the upstream communication information, communication information without redundancy can be integrated and collected in one place. Accordingly, the communication information used in the target system can be efficiently integrated.

Furthermore, in a conventional system that adopts the IP network, since the components such as a hub, a router, and the like are connected in multi-stages, it is difficult to integrate and collect the communication information in a whole network in one place. However, in the example embodiment, since the downstream communication information is integrated into the upstream communication information using the difference communication information, even in a system that adopts the IP network, communication information can be integrated and collected in one place. Accordingly, the communication information used in the target system can be efficiently integrated.

Furthermore, even in a case where the communication information is integrated and collected in one place in a conventional system that adopts the IP network, in the example embodiment, minor ports need not be set with respect to all the network switches provided in the network. Accordingly, the communication information used in the target system can be efficiently integrated.

Furthermore, in the example embodiment, compared to the case where the downstream communication information is locally extracted from the terminal apparatuses 4 and recorded as is conventional, the communication information can be integrated and collected in one place without redundancy with a smaller communication amount and in a shorter time. Accordingly, the communication information used in the target system can be efficiently integrated.

Furthermore, although the communication information may be obtained and recorded via the network using a remote forensic tool or an OS-specific management tool as is conventional, in the case where the communication information recorded in the terminal apparatuses 4 is obtained via the network, if a large volume of communication information is collected from many terminal apparatuses 4, an excessive communication load is placed on the network. However, in the example embodiment, by using the summary information and the difference communication information, it is possible to integrate and collect the communication information in one place without redundancy with a smaller communication amount and in a shorter time. Accordingly, the communication information used in the target system can be efficiently integrated.

Program 1

A program of the communication information integration apparatus according to the example embodiment of the invention need only be a program that causes a computer to execute steps B1 to B8 shown in FIG. 8. The communication information integration apparatus and communication information integration method of the example embodiment can be realized by this program being installed in the computer and executed. In this case, a processor of the computer performs processing while functioning as the communication information collection unit 21, the summary information generation unit 22, and the communication information integration unit 23.

Also, the program of the communication information integration apparatus of the example embodiment may also be executed by a computer system constituted by a plurality of computers. In this case, for example, the computers each may function as one of the communication information collection unit 21, the summary information generation unit 22, and the communication information integration unit 23.

Program 2

A program of the terminal apparatus according to the example embodiment of the invention need only be a program that causes a computer to execute steps C1 to C6 shown in FIG. 9. The terminal apparatus according to the example embodiment and the method thereof can be realized by this program being installed in the computer and executed. In this case, a processor of the computer performs processing while functioning as the communication information collection unit 25 and the difference communication information generation unit 26.

Also, the program of the terminal apparatuses according to the example embodiment may also be executed by a computer system constituted by a plurality of computers. In this case, for example, the computers each may function as one of the communication information collection unit 25 and the difference communication information generation unit 26.

Physical Configuration

Figure 10:
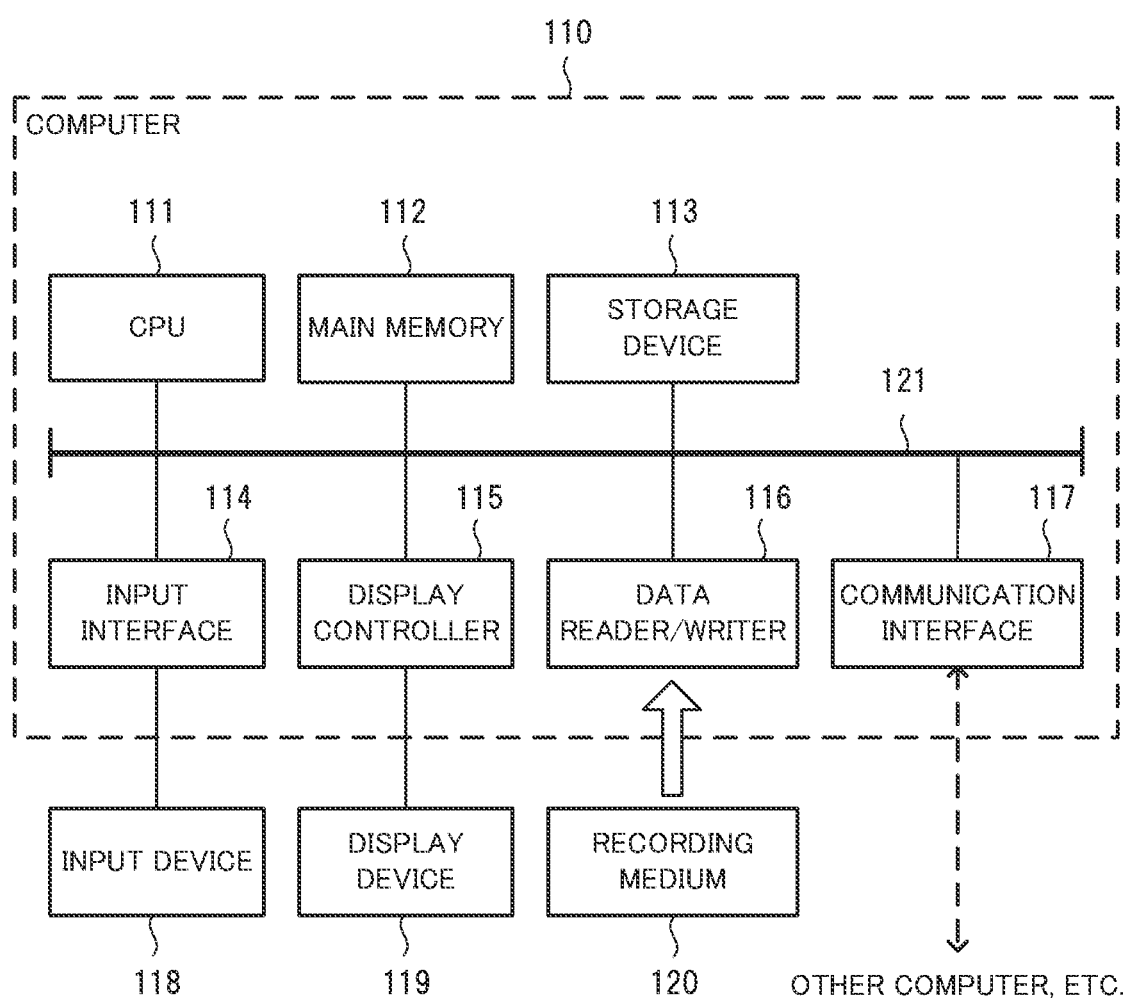
FIG. 10 is a diagram showing an example of a computer that realizes a communication information integration apparatus or the terminal apparatus.

Here, a computer that realizes the communication information integration apparatus 3 or the terminal apparatus 4 by executing the program according to the example embodiment will be described using FIG. 10. FIG. 10 is a block diagram showing an example of a computer that realizes a communication information integration apparatus or the terminal apparatus according to the example embodiment of the invention.

As shown in FIG. 10, a computer 110 includes a CPU 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) of the example embodiment that are stored in the storage device 113 to the main memory 112, and executing these programs in a predetermined order. The main memory 112, typically, is a volatile storage device such as a DRAM (Dynamic Random Access Memory). Also, programs of the example embodiment are provided in a state of being stored in a computer readable recording medium 120. Note that programs according to the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the communication information integration apparatus 3 or the terminal apparatuses 4 of the example embodiment is also realizable by, using hardware corresponding to the respective units, rather than by a computer on which programs are installed. Furthermore, the communication information integration apparatus 3 or the terminal apparatuses 4 may be realized in part by programs, and the remaining portion may be realized by hardware.

Supplementary Notes

Supplementary notes are further disclosed as below with respect to the above-described example embodiment. The example embodiment described above can be partially or wholly realized by supplementary notes 1 to 10 described below, although the invention is not limited to the following description.

Supplementary Note 1

A communication information integration system in which a plurality of terminal apparatuses and a communication information integration apparatus communicate via a network, in which the communication information integration apparatus classifies collected first communication information for each terminal apparatus, generates summary information summarizing the classified communication information corresponding to the terminal apparatus, and transmits the generated summary information to the corresponding terminal apparatus, and upon receiving, from the terminal apparatus, difference communication information that is generated by the terminal apparatus based on second communication information collected by the terminal apparatus and the summary information, the communication information integration apparatus integrates the difference communication information into the first communication information, and the terminal apparatus, upon receiving the summary information, extracts a difference between the first communication information and the second communication information collected by the terminal apparatus using the second communication information and the summary information, generates the difference communication information based on the extracted difference, and transmits the generated difference communication information to the communication information integration apparatus.

Supplementary Note 2

A communication information integration method in a network that includes a plurality of terminal apparatuses and a communication information integration apparatus, the method including:

the communication information integration apparatus classifying collected first communication information for each terminal apparatus, generating summary information summarizing the classified communication information corresponding to the terminal apparatus, and transmitting the generated summary information to the corresponding terminal apparatus;

when the terminal apparatus receives the summary information, the terminal apparatus extracting a difference between the first communication information and second communication information collected by the terminal apparatus, using the second communication information and the summary information, generating the difference communication information based on the extracted difference, and transmitting the generated difference communication information to the communication information integration apparatus; and when the communication information integration apparatus receives the difference communication information generated by the terminal apparatus from the terminal apparatus, the communication information integration apparatus integrating the difference communication information into the first communication information.

Supplementary Note 3

A communication information integration apparatus including:

summary information generation unit configured to classify collected first communication information for each terminal apparatus that communicates via a network, and generate summary information summarizing the classified communication information corresponding to the terminal apparatus; and communication information integration unit configured to, upon receiving, from the terminal apparatus, difference communication information that indicates a difference between the first communication information and second communication information collected by the terminal apparatus and is generated by the terminal apparatus, using the second communication information and the summary information received via the network, integrate the difference communication information into the first communication information.

Supplementary Note 4

The communication information integration apparatus according to supplementary note 3, in which the summary information generation unit classifies the first communication information for each terminal apparatus using terminal identification information for identifying the terminal apparatus, and generate the summary information by converting a data structure of the classified communication information corresponding to the terminal apparatus into a probabilistic data structure or a data compression expression structure.

Supplementary Note 5

A computer-readable recording medium that includes a program recorded thereon, the program including instructions that cause a computer to carry out:

(a) a step of classifying collected first communication information for each terminal apparatus that communicates via a network, and generating summary information summarizing the classified communication information corresponding to the terminal apparatus; and (b) a step of, upon receiving, from the terminal apparatus, difference communication information that indicates a difference between the first communication information and second communication information collected by the terminal apparatus and is generated by the terminal apparatus, using the second communication information and the summary information received via the network, integrating the difference communication information into the first communication information.

Supplementary Note 6

The computer-readable recording medium according to supplementary note 5, in which in the (a) step, the first communication information is classified for each terminal apparatus using terminal identification information for identifying the terminal apparatus, and the summary information is generated by converting and compressing a data structure of the classified communication information corresponding to the terminal apparatus into a probabilistic data structure or a data compression expression structure.

Supplementary Note 7

A terminal apparatus including:

difference communication information generation unit to, upon receiving, from a communication information integration apparatus that communicates via a network, summary information that is generated by the communication information integration apparatus classifying collected first communication information for each terminal apparatus and summarizing the classified communication information corresponding to the terminal apparatus, generate difference communication information that indicates a difference between the first communication information and collected second communication information, using the second communication information and the summary information.

Supplementary Note 8

The terminal apparatus according to supplementary note 7, in which the difference communication information generation unit extracts the second communication information that is not included in the first communication information, based on the summary information and the second communication information, and generate the difference communication information based on the extracted second communication information.

Supplementary Note 9

A computer-readable recording medium that includes a program recorded thereon, the program including instructions that cause a computer to carry out:

(a) a step of, upon receiving, from a communication information integration apparatus that communicates via a network, summary information that is generated by the communication information integration apparatus classifying collected first communication information for each terminal apparatus and summarizing the classified communication information corresponding to the terminal apparatus, generating difference communication information that indicates a difference between collected second communication information and the summary information.

Supplementary Note 10

The computer-readable recording medium according to supplementary note 9, in which in the (a) step, the second communication information that is not included in the first communication information is extracted, based on the summary information and the second communication information, and the difference communication information is generated based on the extracted second communication information.

Although the invention of the present application has been described above with reference to example embodiments, the invention is not limited to the example embodiments described above. Various modifications apparent to those skilled in the art can be made to the configurations and details of the invention within the scope of the invention.

Industrial Applicability

As described above, according to the invention, communication information used in the target system can be efficiently integrated. The invention is useful in cyber security, especially when system operators or incident analysts collect communication logs for handling incidents.

List of Reference Signs

1 Communication information integration system
2 Network
3 Communication information integration apparatus
4 Terminal apparatus
21 Communication information collection unit
22 Summary information generation unit
23 Communication information integration unit
24 Storage unit
25 Communication information collection unit
26 Difference communication information generation unit
27 Storage unit 110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A communication information integration system in which a plurality of terminal apparatuses and a communication information integration apparatus communicate via a network, wherein, for each of the terminal apparatuses:

the communication information integration apparatus classifies first communication information collected from upstream of the network for the terminal apparatus, generates summary information that summarizes information that is key information of the classified first communication information, and transmits the generated summary information to the terminal apparatus, the terminal apparatus, upon receiving the summary information, extracts a difference between the first communication information and second communication information collected by the terminal apparatus based on the summary information, generates difference communication information based on the on the extracted difference, and transmits the generated difference communication information to the communication information integration apparatus, the communication information integration apparatus, upon receiving the difference communication information, integrates the difference communication information into the first communication information, and wherein the communication information integration apparatus generates the summary information by performing mask processing on the classified first communication information, and applying a probabilistic data structure or a data compression expression structure to the key information including at least date-time and connection duration that have been subjected to mask processing, and a transmission source IP (Internet Protocol) address, a transmission port, a reception destination IP address, and a reception port.

2. The communication information integration apparatus according to claim 1, wherein a Bloom filter is used as the probabilistic data structure, and ZDD (zero suppressed Binary Decision Diagram) and BDD (Binary Decision Diagram) are used as the data compression representation structure.

3. A communication information integration method in a network that includes a plurality of terminal apparatuses and a communication information integration apparatus, the method comprising, for each of the terminal apparatuses:

by the communication information integration apparatus, classifying first communication information collected from upstream of the network for the terminal apparatus, generating summary information that summarizes information that is key information of the classified first communication information, and transmitting the generated summary information to the terminal apparatus, by the terminal apparatus, upon receiving the summary information, extracting a difference between the first communication information and second communication information collected by the terminal apparatus based on the summary information, generating difference communication information based on the on the extracted difference, and transmitting the generated difference communication information to the communication information integration apparatus; and by the communication information integration apparatus, upon receiving the difference communication information, integrating the difference communication information into the first communication information, wherein the communication information integration apparatus generates the summary information by performing mask processing on the classified first communication information, and applying a probabilistic data structure or a data compression expression structure to the key information including at least date-time and connection duration that have been subjected to mask processing, and a transmission source IP (Internet Protocol) address, a transmission port, a reception destination IP address, and a reception port.

4. The communication information integration method according to claim 3, wherein a Bloom filter is used as the probabilistic data structure, and ZDD (zero suppressed Binary Decision Diagram) and BDD (Binary Decision Diagram) are used as the data compression representation structure.

* * * * *